July 14, 1959 V. CLAIR, JR 2,894,322
METHOD OF COLD PRESSURE WELDING METAL FOIL
Original Filed July 12, 1954
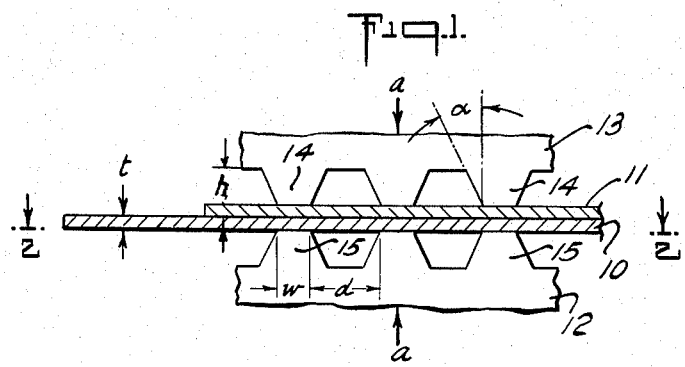
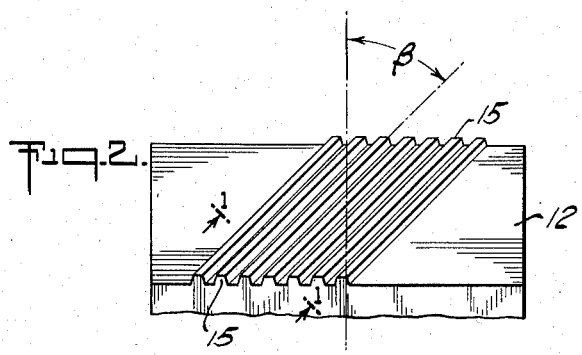
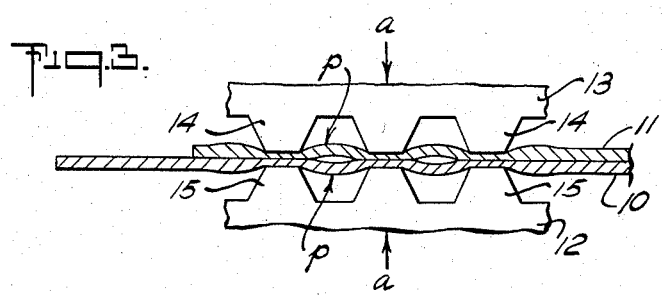
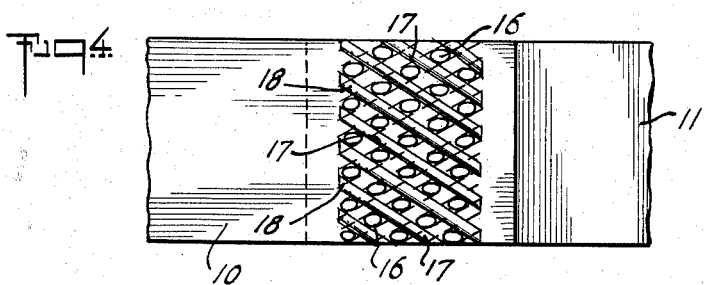
INVENTOR
VERNE CLAIR JR.
BY
ATTORNEY

United States Patent Office

2,894,322
Patented July 14, 1959

2,894,322

METHOD OF COLD PRESSURE WELDING METAL FOIL

Verne Clair, Jr., Levittown, N.Y., assignor, by mesne assignments, to Kelsey-Hayes Company, Detroit, Mich., a corporation of Delaware Original application July 12, 1954, Serial No. 442,558, now Patent No. 2,763,057, dated September 18, 1956. Divided and this application August 15, 1956, Serial No. 604,168

2 Claims. (Cl. 29—470.1)

This application is a division of my copending application Serial No. 442,558, filed July 12, 1954, entitled Cold Pressure Welding of Metal Foil, now Patent No. 2,763,057.

The present invention relates to cold pressure welding, that is, the welding by a solid phase joint of metallic members of aluminum, copper or other ductile and cold pressure weldable materials, substantially by pressure and without the use of external welding heat, more particularly to the welding of members of relatively small thickness, such as metal sheet or foil.

In the art of cold pressure welding of metals or welding under conditions where no liquid phase is produced or introduced into the weld at any stage, that is, where welding is effected solely by pressure and without the application of extraneous welding heat, a suitable design of the pressure welding tools and a proper control of the tool pressure, after properly cleaning the areas of contact to be joined, results in an interfacial cold or plastic flow of the metals of the adjoining surfaces conducive to effect merging into a solid phase welding bond or joint.

There has already been proposed, as described for example in U.S. Patent 2,522,408, a method of and means for lap welding a pair of metallic members by cold pressure welding, such as plates, sheets or the like, of aluminum, copper or other ductile metal or metal alloy capable of cold pressure welding. More specifically, said patent discloses various techniques and tools for producing either a continuous line weld or a spot weld at one or more limited areas of a pair of members to be welded.

Since, as described in said patent, in cold pressure welding metal must flow laterally of the areas subjected to pressure by the welding tools, or, in other words since the metal of the contacting surfaces is expanded under pressure such as to effect merging into a true solid phase welding bond, the most efficient tool shape or pressure area for the welding of members of relative large gauge thicknesses has been found to be of a strip-like or rectangular shape or area, the width of the strip or rectangle being approximately equal to or of the order of the gauge thickness of the members being welded, but not being any more than about twice said thickness.

The shape or width of the weld area, in addition to involving a minimum of distortion and tool penetration, that is, about 60% of the total thickness of the members for aluminum and about 86% for copper, insures a favorable and unimpeded flow of metal laterally of the contacting surfaces, whereby to enable the attainment of an intimate and reliable welded bond of adequate mechanical strength and other desirable characteristics.

In effecting a lap pressure weld according to this technique, as the thickness of the members to be welded decreases, the necessarily reduced dimension of the pressure tools makes it increasingly difficult to control the tool penetration so as to prevent damage to the members and to insure efficient and consistent welding with sufficient accuracy. As a result, in following the technique disclosed by the above-mentioned patent, a practical limit is soon reached for members of greatly reduced thickness, practically from about 0.030" on downward, and better known as sheets or foils, where any effective and reliable welding will no longer be possible, both on account of the minute size of the welding tools or areas and due to the increased difficulty of controlling the tool penetration or indentation required to insure positive and dependable welding.

It has already been proposed, as described in U.S. Patent No. 2,707,889, to weld relatively thin members of pressure weldable material, such as metal sheet or foil, by the use of a modified and improved technique and method comprising applying welding pressure to a strip-like area of the lapped sheets whose width is a substantial multiple of, that is at least twice, the gauge thickness of the members being welded. As a result of the increased width of the weld area or pressure tool face, metal is not only caused to flow laterally and in the direction of the interface between the members, as in the case of welding relatively thicker members by using a tool width of the order of the gauge thickness of the members, but there is produced a stretching or drawing action on the metal, causing an expansion or metal flow around the welding tool or tools and resulting in a distortion of the members in a direction at right angle to the plane thereof. This stretching action or coexpansion of the contacting metal surfaces, while promoting the formation of an efficient weld has the further effect of breaking up or dispersing the superficial oxide film usually present upon the surface, especially in the case of aluminum, into small particles, whereby, in most cases, to enable welding without pre-cleaning of the members, except for the removal of contaminating foreign matter, such as dirt, grease, etc. As a result, the cross-section of the resultant weld joint assumes the shape of a trough or channel due to the drawing effect or upflow of the metal around the edges of the welding tool or tools.

It has been found, in cold pressure welding, that the most critical phase during the welding operation is the starting of the welding action or mutual pickup of the metals of the two members while, with welding having once been initated at a limited area, usually in the center of the weld line or strip, it will spread readily to the edges or periphery of the weld area during continued pressure application. In making a foil weld of the type described, an initial and safe pickup of the metals is insured by the drawing or stretching action on the metals, thus insuring merging and welding positively and reliably.

While it has thus been possible to produce an efficient and reliable cold weld joint between two relatively thin members, such as sheets or foils, it will be understood that such a weld or joint still suffers greatly from a strength point of view, whereby to render its use limited if not prohibitive for many practical purposes and applications. Both the substantial metal reduction at the weld area as well as the linear shape of the weld, result in a low resistance to bending of the joint as well as other defects well known and understood.

Accordingly, an important object of the present invention is the provision of an improved method of cold pressure welding a pair of metal members of relatively small thickness, such as sheets or foils, whereby the above and related defects and drawbacks are substantially eliminated.

Another object of the invention is the provision of a combined cold pressure welding and/or pressing method for joining together two metal foil members or the like, whereby to attain both an efficient weld joint between the members and to improve the mechanical strength of the joint produced by a single operating step or pressure application.

In order to attain the above objects and purposes, there is described in the above-named parent application, Serial No. 442,558, an improved method of welding relatively thin members such as metal foil, that is for all practical purposes, members having a thickness of less than about 0.030 inch which method comprises essentially the steps of superimposing a pair of foils or sheets with the portions thereof to be joined in contacting relation, applying indenting pressure to a plurality of substantially identical and evenly distributed welding areas, said areas having a minimum width in any direction equal to a multiple of and at least twice the foil thickness, whereby to reduce the metal thickness and to create a drawing action at said areas out of the initial plane of the sheets etc. as well as to cause a metal displacement laterally of said areas. Furthermore, the spacing distances between the welding areas are so related to the foil thickness as to cause the metal displaced from each indented area to oppose the metal flow from an adjacent area, whereby to force the displaced metals of the intervening non-indented areas out of the plane of the foils or the like members, in such a manner as to produce a uniformly distorted or crinkled shape of the portions upon welding thus to strengthen the joint obtained mechanically.

In a method of this character, the indented or weld areas are in the form of parallel lines spaced at proper distances from one another, whereby to result in a corrugated and mechanically strengthened joint. The bending of such a joint is, however, limited to bending about an axis at right angle to the weld lines or corrugations, while little strength exists against bending about a line parallel to said corrugations. For a joint to have an equal strength in more than one direction, the indented or weld areas should be in the form of weld spots, such as of square, rectangular or other suitable shape, said spots being evenly distributed over the entire joint at a proper mutual spacing from one another in the manner of a mosaic or uniform pattern.

As described in said copending parent application, for producing a weld of this type, the tools used may comprise a first tool member having a flat surface to serve as an anvil and a second cooperating tool member also provided with a flat surface and having projecting therefrom a plurality of indenters conforming with the desired multiple weld areas, that is, either in the form of parallel ribs or tongues or a plurality of uniformly distributed and equally spaced welding tips, respectively.

While in the case of parallel weld lines and a resultant corrugated joint, the tools or dies may be simply and accurately produced by the provision of parallel grooves or flutes machined in the tool surface, considerable difficulties are encountered in producing a large number of relatively small welding tips, especially in the case of sheets of foil of reduced thickness, such as to afford efficient and safe welding at all the weld spots or points and to prevent damage to the foils and other drawbacks, as will be readily understood.

Accordingly, another object of the invention is the provision of a simple and efficient method of making a multiple spot weld joint of two metal foil pieces or the like, while at the same time mechanically strengthening the joint produced.

The above and further objects, as well as novel aspects of the invention, will be better understood from the following detailed description taken in reference to the accompanying drawings forming part of this specification and wherein:

Fig. 1 shows on an exaggerated scale and in schematic fashion a welding tool and a pair of metal foils or the like inserted therein to be welded, the tool and foils being shown in the position prior to welding;

Fig. 2 is a top view, on a reduced scale, of one of the tool members taken on line 2—2 of Fig. 1;

Fig. 3 shows the tool of Fig. 1 and foil in the position after welding; and

Fig. 4 is a top view showing a pair of foil pieces welded by means of the method according to the invention.

Like reference characters identify like parts in the different views of the drawing.

With the foregoing and further objects of the invention in view, as will appear hereafter, the above mentioned and related difficulties are substantially overcome by an improved method and technique of welding metal foils or the like members involving generally the production of a multiplicity of uniformly spaced weld spots or areas and an automatic control of the welding operation, on the one hand, and a strengthening of the welded joint by a crinkling, knotting or the like effect of the welded metals.

This combined effect of welding and strengthening of the joint obtained is achieved by the use of a pair of welding tool members having flat surfaces and projecting therefrom a plurality of parallel indenting ribs or tongues of suitable width and relative spacing. The tools are arranged with the ribs of one tool member crossing or intersecting the ribs of the other tool member, whereby, in addition to the indenting and welding of the members at the crossover or intersecting points of the welding ribs, to effect both a control of the welding operation and a strengthening or stiffening of the welded joint obtained. In other words, while using simple linear indenters or welding ribs which can be produced to exacting specifications, the resultant joint is of the type comprising a mosaic like pattern of a great number of uniformly distributed and relatively evenly spaced weld spots or areas, providing adequate mechanical strength to bending in substantially all directions.

In other words, the present invention is predicated on the thought of utilizing the stretching effect or upflow of the displaced metal in a foil weld process using tools suitably related to the foil thickness, to deform or cause a buckling effect on the metal between the indented areas, thus strengthening the joint obtained against bending in substantially any direction.

Referring more particularly to Figs. 1 and 2 of the drawing, there is shown a tool arrangement according to the invention for welding two relatively thin members 10 and 11, such as metal sheets or foils, etc., said tool comprising essentially a lower tool member 12 having a flat surface and projecting therefrom a plurality of tapering and parallel indenters or welding ribs 15 of a width $w$ and being spaced from one another by predetermined distances $d$. More particularly, the width $w$ of the indenters is a multiple of, that is at least twice the gauge thickness $t$ of the members 10 and 11, while the distance $d$ between the adjacent indenters, for most practical purposes, should be greater than or about 1.5 times the width $w$, as shown in the example of the drawing. The dimensions $w$ and $d$ may be advantageously determined by experiment, it being essential only, that the width of the indenters is a sufficient multiple of the gauge thickness $t$, to cause the necessary upflow of the metal around the tool members 12 and 13 and to effect a buckling of the intervening non-indented areas, as described in the following and shown in Fig. 3.

Furthermore, the height $h$ of the indenters, while not critical, should be such as to afford a ready displacement and buckling of the metal, to insure adequate metal flow at the indented areas conducive to welding, on the one hand, and to enable the displaced metal to move at a right angle to the members and to produce a strengthening of the joint obtained. The tapering angle $\alpha$ of the indenters may be about 15°, although this value is not critical and may be varied within limits. The tools 12 and 13 may be constructed from mild steel or from unhardened chrome manganese tool steel, the latter being especially suitable for the welding of aluminum sheet or foil.

The cooperating or upper tool 13 also has a flat surface and projecting therefrom a plurality of parallel welding ribs or strip-like indenters 14 or supporting surfaces, respectively, arranged at an angle, such as a right angle, to the indenters 15 of the tool member 12, whereby to cross the latter at a plurality of intersection points constituting the actual indenting or weld areas. Preferably the indenters 14 and 15 form an angle β, Fig. 2, with the short axis of the tool face, such as about 30° as shown in the drawing, to result in maximum mechanical strength and stiffness as will become further apparent from the following.

In a tool of the type described, the metal at the contacting or intersecting areas of the indenters 14 and 15, upon the application of suitable welding pressure to the tool members in the direction indicated by the arrows *a* in the drawing by means of a hand press or the like, is subjected to a drawing action, causing an expansion or stretching of the metals at the interface and resulting in a safe initiation of the welding or merging of the interfacial surfaces into an intimate union or solid phase welding bond. At the same time, the stretching effect causes a breaking up or dispersion of the superficial oxide film usually present upon the surface of the members, especially in the case of aluminum, whereby to allow welding without precleaning, at least as far as removal of the oxide film is concerned.

Furthermore, due to the specific relationship between the width *w* of the indenters 14 and 15, the gauge thickness *t* and the spacing distances *d*, the metal at the areas *d* is allowed to move freely so as to flow outside of the indented areas in a direction substantially at right angle to the interface, that is, in other words, to cause an upflow or buckling of the members, as shown at *p* in Fig. 3. In other words, the metal between the welded areas is formed into a plurality of protuberances or knots 16, Fig. 4, resulting in mechanical strengthening or stiffening of the welded joint.

In addition to the combined welding and crinkling of the members as a result of the single pressure operation, the invention has the further advantage of automatically controlling the welding or tool penetration to result in efficient and consistent joints, without requiring auxiliary control or stop means for the tool members 12 and 13.

More specifically, provided a proper design of the width *w* of the indenters 14 and 15, as well as the spacing distance *d* and the height *h* of the indenters, the metal is allowed to flow relatively unimpeded during the initial stage of the pressure application, thus causing indentation and welding, in the manner described. As the pressure application is continued the flow of the metal displaced laterally of the weld areas at the intersection points of the indenters will be increasingly opposed by the metal displaced in the opposite direction from an adjacent weld point or area, whereby to result both in a stiffening or crinkling of the members, on the one hand, and to automatically control the indentation or metal reduction required to produce an adequate metal flow conducive to welding at the intersection spots or areas. As a result, by the proper tool design, welding may be controlled accurately and consistently in a most simple manner, compared with other cold pressure welding methods which require special stop and auxiliary means to control and limit the depth of indentation for safe and reliable welding. This advantage of the invention is of special importance in the welding of thin sheets or foils, where slight discrepancies in the tools or control may result in cutting or other damage to the members, in view of the minute size and dimensions as well as tool penetration involved.

In practice it has been found that welding may be effected over a considerable range of gauge thicknesses and with materials of any given ductility or degree of cold weldability, provided the width of the indenters is a suitable multiple of the gauge thickness and that the spacing distances or gaps between adjacent indenters are so designed as to enable ready lateral metal flow to enable welding, on the one hand, and to strengthen the resultant joint in the manner described, on the other hand.

It has furthermore been found that pressure welding of two members at an area or spot having substantially equal dimensions in all directions, such as a circular, square or the like area, is difficult without effecting excessive metal reduction or without limiting the joint to the edge portion or periphery of the area, due to the limited and uniform metal flow in substantially all directions, wherefore the advantage of a rectangular or strip-like weld area causing a preferential flow at right angles to the larger side of the rectangle or weld strip. By the present invention, this difficulty is principally overcome by the use of strip-like indenters insuring adequate flow of the metal during welding, while limiting the weld joint to a plurality of uniformly spaced weld spots at the areas of intersection of said indenters. In other words, the invention by using known and proven techniques in a new combination achieves both a strong and reliable multiple spot weld at areas having substantially equal dimensions in all directions, substantially without the drawbacks and defects inherent in the previous prior art methods.

This is shown more clearly in Fig. 4, wherein the numerals 18 indicate the channels produced by the indenters or ribs 14 and 15 by the stretching and upflow of the metal around the edges of the indenters as a result of the width *w* being a multiple of the gauge thickness *t* of the members 10 and 11. The same channels 18 appear upon the underside of the members 10 and 11. This stretching effect or metal flow laterally of the channels or strip-like areas 18 results in a welding at the intersecting spots or areas 17 of the ribs 14 and 15 due to the increased pressure thereat at right angle to the interface. At the same time, the metal displaced laterally of the areas 18 is distorted or forced in a direction transverse to or out of the planes of the foils or members 10 and 11, in such a manner as to result in a uniform embossing or crinkling of the entire welded area as shown at 16, causing a stiffening or increased mechanical strength of the total welded area against bending in substantially all directions.

According to a practical example, a tool having indenters of a width *w* equal to 0.020", a spacing distance *d* equal to 0.035" and a height *h* equal to 0.030", has been found suitable for satisfactorily welding aluminum foils within a thickness range from about 0.002" to 0.010". For other thicknesses and materials of different ductility the most favorable tool dimensions can be determined simply by experiment by following the basic considerations and requirements as pointed out hereinabove.

In the foregoing the invention has been described with reference to a specific illustrative device and method. It will be evident, however, that modifications and variations, as well as the substitution of equivalent elements and steps for those shown and described for illustration, may be made without departing from the broader scope and spirit of the invention as set forth in the appended claims. The specification and drawings are accordingly to be regarded in an illustrative rather than in a limiting sense.

I claim:

1. A method of welding relatively thin members of ductile cold pressure weldable metal having a thickness of less than about 0.030 inch comprising superimposing said members with the portions to be joined in contacting relation, supporting one side of the superposed members by a plurality of spaced, parallel and strip-like supporting surfaces having a width equal to a multiple of the gauge thickness of said members, applying a pressure to the opposite side of the superposed members over a plurality of spaced, parallel and strip-like pressure areas having a width substantially equal to the width of said supporting surfaces, said supporting surfaces intersecting said pressure areas at a predetermined angle to each other, and continuing the pressure application to cause a stretching of the metals laterally of and an upflow around the edges of said areas, thereby to result in an intensified interfacial action by the added pressure at the intersecting portions of said areas conducive to producing a plurality of solid phase spot-like welding joints thereat, while distorting the areas exterior of said joints out of the planes of said members, to result in a mechanical strengthening of the total welded area of said members.

2. A method of welding relatively thin ductile metal members having a thickness of less than about 0.030 inch comprising superimposing said members with the areas to be joined in contacting relation, supporting one side of the superposed members by a plurality of parallel and strip-like supporting surfaces having a width equal to a multiple of the gauge thickness of said members and spaced by distances equal to about 1.5 times said width, applying a pressure to the opposite side of the members over a plurality of spaced, parallel and strip-like pressure areas having a width and relative spacing substantially equal to the width and relative spacing of said supporting areas, said supporting areas intersecting said pressure areas at a predetermined angle to each other, and continuing the pressure application to cause a stretching of the metals laterally of and an upflow around the edges of said areas, thereby to result in an intensified interfacial action by the added pressure at the intersecting portions of said areas conducive to producing a plurality of spot-like solid phase welding joints thereat, while distorting the areas exterior of said joints out of the planes of said members, to result in a mechanical strengthening of the total welded area of said members.

References Cited in the file of this patent
UNITED STATES PATENTS

| | | |
|---|---|---|
| 1,253,189 | Von Henke | Jan. 8, 1918 |
| 2,522,408 | Sowter | Sept. 12, 1950 |
| 2,763,057 | Clair | Sept. 18, 1956 |